United States Patent [19]
Do et al.

[11] Patent Number: 5,133,995
[45] Date of Patent: Jul. 28, 1992

[54] PROCESS AND DEVICE FOR PREIMPREGNATING REINFORCING ELEMENTS USABLE FOR MAKING A COMPOSITE MATERIAL, PRODUCT OBTAINED

[76] Inventors: Anh T. Do, Residence Beauregard 35, Avenue Saut du Loup, 78170 La Celle Saint Cloud; Michel Huvey, 2, Avenue des Pinsons, 78380 Bougival, both of France

[21] Appl. No.: 742,739

[22] Filed: Aug. 6, 1991

Related U.S. Application Data

[63] Continuation of Ser. No. 460,323, filed as PCT/FR89/00186, Apr. 20, 1989, abandoned.

[30] Foreign Application Priority Data

Apr. 22, 1988 [FR] France .................................. 88 05492

[51] Int. Cl.$^5$ ............................................. B05D 3/10
[52] U.S. Cl. ................................... 427/294; 427/296; 427/314; 427/439; 118/50
[58] Field of Search ............... 427/296, 314, 439, 294; 118/50, 429; 68/198, 189

[56] References Cited

U.S. PATENT DOCUMENTS

| | | |
|---|---|---|
| 1,986,319 | 1/1935 | Bongrand et al. .................. 427/296 |
| 2,577,727 | 12/1951 | Abbott ................................... 68/189 |
| 3,042,546 | 7/1962 | Henningsen ..................... 427/296 X |
| 3,384,505 | 5/1968 | Palmer .................................. 117/54 |
| 3,730,678 | 5/1973 | Wedler et al. ....................... 8/149.1 |
| 3,876,464 | 4/1975 | McNerney ..................... 427/295 X |
| 4,384,014 | 5/1983 | Young ................................... 427/294 |

*Primary Examiner*—Shrive Beck
*Assistant Examiner*—Alain Bashore
*Attorney, Agent, or Firm*—Antonelli, Terry, Stout & Kraus

[57] ABSTRACT

A process for preimpregnating reinforcing elements with a liquid substance includes the following series of steps or stages: placing the reinforcing elements in a sealable enclosure, applying a vacuum of sufficient intensity and duration to the enclosure to eliminate at least the majority of water and gas present in the reinforcing elements contained therein and introducing sufficient liquid substance into the enclosure for the substance to cover the elements once the elements have been impregnated. The device for carrying out this process includes an enclosure for containing the elements, means for applying a vacuum to the enclosure for removing at least the majority of the water and gas present in the reinforcing elements and an orifice or conduit for introducing the liquid substance into the enclosure.

8 Claims, 1 Drawing Sheet

PROCESS AND DEVICE FOR PREIMPREGNATING REINFORCING ELEMENTS USABLE FOR MAKING A COMPOSITE MATERIAL, PRODUCT OBTAINED

This application is a continuation of application Ser. No. 460,323, filed as PCT/FR89/00186, Apr. 20, 1989, now abandoned.

BACKGROUND OF THE INVENTION

The present invention relates to a process and a device allowing reinforcing elements such as fibers, fabrics, or braids to be preimpregnated before using them in the production of composite materials for the parts that are to be made.

By comparison to (continuous) impregnation of reinforcing elements, which is done just before using the composite parts to be manufactured, preimpregnation allows the product obtained to be stored for a relatively long time (several months), the number of bubbles included in the parts, to be reduced, and fraying of the reinforcing elements to be reduced.

More particularly, the present invention provides an improvement in the process and device for preimpregating reinforcing elements with a stabilizable substance such as a liquid thermosetting resin.

Previous reinforcing element preimpregnation techniques consist for example of causing the substance to penetrate under pressure, but penetration is not homogeneous and gases such as air or steam are dissolved.

The technique currently in broadest use for preimpregnation consists of causing the resin (diluted with a volatile solvent such as acetone or methanol) to penetrate reinforcing fibers by passage through a bath or over a roller, then causing this solvent to evaporate in a tunnel furnace of considerable length, and finally winding the preimpregnated thread or strip.

Usually, the heat treatment brings the resin into state B, meaning that the resin is solid at ambient temperature but can be melted by reheating.

If the resin melting point can be reached during storage, an antiadhesive film is interposed beneath the preimpregnated threads before winding, so that unwinding is always possible under cold conditions without injuring the reinforcing fibers. Without interposition of such an antiadhesive film, and if the melting point is reached during storage, the spool after cooling would turn into a solid block.

It is not possible to unwind a thread or strip from a spool that has turned into a block without at least seriously damaging the fibers, which would bring about a severe deterioration of the mechanical properties of the object eventually made with these fibers.

The presence of solvent, necessary for impregnation to be rapid with resins that are viscous even when hot, such as epoxy resins, results in the quantity of resin actually entrained by the fibers being small, on the order of 25 to 37% by volume.

It is not possible, with these prior processes, to obtain preimpregnated reinforcing elements with high resin contents—45 to 55% by volume.

For the purpose of preimpregnation with a resin diluted with a solvent, avoiding the continuous drying tunnel furnace, it has also been proposed that the spool be impregnated directly by creating a soft vacuum to prevent the solvent from boiling, then admitting the resin diluted with the solvent, and then applying a pressure to force the dilute resin into the fibers.

It is then eventually necessary to drive off the solvent by heat treatment in a soft vacuum to prevent the solvent from boiling.

This treatment brings the resin into state B, meaning that the product is virtually unusable without serious damage to the fibers.

In both cases, the use of a solvent in impregnation decreases the volume when the solvent is removed. This decrease in volume causes voids to appear between the fibers, or peeling at the glass-resin interface with the appearance of bubbles.

The products cast from these preimpregnated materials are not transparent but translucent or milky in the best case, owing to the presence of numerous microbubbles.

These bubbles considerably impair the mechanical properties which are not dependent on the presence of fibers alone. Thus, shear resistance is substantially affected by the presence of microbubbles.

These microbubbles also permit condensation of water that has penetrated by permeability through the resin, and this condensed water may attack the reinforcements which are sensitive to it, such as fiberglass. The properties may then deteriorate over time, particularly in a moist environment and in the presence of temperature cycles, corresponding to natural aging.

To avoid these drawbacks, it has been proposed that objects that have been pre-formed, for example by winding onto a mandrel, be impregnated under vacuum by solvent-free resin and subjected to vacuum treatment allowing the air to be drawn out of the fibres and the object to be impregnated to the core, giving a good-quality product after polymerization; the mandrel is then removed.

The Grummi document in Asbest, Kunststoffe, 1982, Vol. 35, pages 630–635 shows that the thicknesses impregnatable by this process are small unless the time is prohibitively long. In practice, the maximum impregnation thickness is limited to 12 mm.

SUMMARY OF THE INVENTION

The process according to the invention allows thick spools to be preimpregnated with viscous solvent-free resins, furnishing spools of preimpregnated material in the A state, with higher resin contents by volume than in traditional processes. This eventually leads to finished products with lower elasticity moduli but which retain high strength in the long term (fatigue, aging).

An additional advantage of the invention is providing a process which avoids much of the handling of the products formed and eventually impregnated.

Another advantage of the invention is that it furnishes reinforcing elements preimpregnated with a substance in state A which can be made to evolve, for its viscosity to be adjusted, in such a way that the preimpregnated threads cannot slip when applied for use. The latter advantage cannot be obtained with reinforcing elements when they are dry nor when they are preimpregnated with resin in state B, nor when they are continuously impregnated with resin in state A.

State A of the resin is understood to mean the state in which the resin is liquid, soluble, and sticky (at ambient temperature).

State B of the resin is understood to be the state in which the resin is solid, meltable, and non-sticky (at ambient temperature).

The present invention proposes a process and a device that furnish preimpregnated products containing the substance in state A, particularly containing no gas and no dissolved solvents, which are free of microporosities after heating.

The composite parts obtained by the process and the device according to our invention have improved physical and chemical properties such as mechanical properties (traction, compression, shear, etc.) and optical properties, homogeneity, and water resistance.

The threads used for making the elements may be made of carbon, boron, glass, or polyamide for example.

The invention furnishes a process for preimpregnating said reinforcing elements such as fabrics, fibers, or braids with a substance, said reinforcing elements being usuable for making a composite material.

This process is in particular characterized by comprising the following series of stages:

the reinforcing elements are placed in an enclosure, a vacuum of sufficient intensity and duration is produced in the enclosure to eliminate at least the majority of the water and/or gas present in the reinforcing elements, and a sufficient quantity of substance is introduced into the enclosure for the substance still to cover the elements once they have been impregnated.

Said substance can be degassed under vacuum before being introduced into the enclosure.

Said substance can be used when hot.

After the sufficient quantity of the substance has been introduced, the enclosure can be kept under vacuum. When the vacuum has been produced in the enclosure and the substance has been introduced into said enclosure in a sufficient quantity for the substance still to cover said elements once they have been impregnated, the enclosure can be pressurized.

When the enclosure has been pressurized, introduction of materials such as gas or water into the substance impregnating the reinforcing elements can be prevented. The reinforcing elements may be fibers wound onto a mandrel and the turns of consecutive layers may cross at an angle of at least 30° and preferably at least 45° or even 60°.

When the reinforcing elements are braids or strips of fabric, impregnation can be accomplished directly onto the spool of braids or strips as furnished by the braiding or ribbon-making machine.

When these reinforcing elements are fibers wound onto a mandrel, the mandrel may be perforated.

The invention also supplies a device for preimpregnating, with a substance, reinforcing elements such as the fibers of fabric or braids, said reinforcing elements being usable for making a composite material.

This device is particularly characterized by having an enclosure designed to contain the elements and designed to produce a vacuum, vacuum pumping means for removing at least the majority of the water and/or gases present in the reinforcing elements, and an orifice designed for introduction of the substance.

The enclosure of this device may be designed to withstand a pressure higher than atmospheric pressure and this device may have means enabling this enclosure to be pressurized to this pressure.

BRIEF DESCRIPTION OF THE DRAWINGS

The invention will be understood and its advantages will emerge more clearly from reading the description hereinbelow of one example of preimpregnation of reinforcing elements, illustrated by the attached figures wherein.

DETAILED DESCRIPTION OF THE INVENTION

Figure 1:
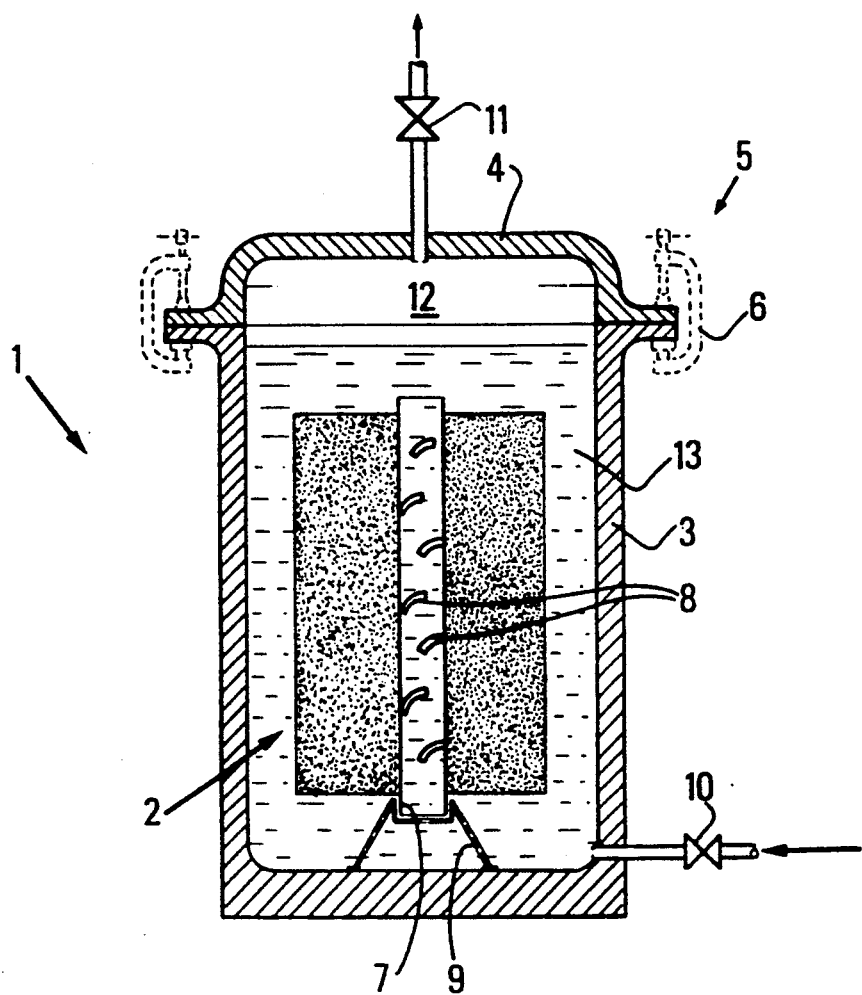
FIG. 1 is a schematic diagram of the device allowing the method to be worked.

In FIG. 1, enclosure 1 for preimpregnating spool 2 of reinforcing elements has a body 3 and a lid 4 covering this body, with closing means 5. These closing means are sufficiently tight and designed for a vacuum to be produced in the enclosure and for the enclosure to be slightly pressurized. These means may for example comprise a gasket placed between body 3 and lid 4 and quick-acting clamps 6.

In the example shown in the figures, the reinforcing fibers are wound onto a hollow mandrel 7 which is kept substantially vertical in enclosure 1. This mandrel 7 is perforated with holes 8, substantially uniformly distributed, to facilitate proper degassing of the reinforcing elements. Enclosure 1 has a lower orifice 10 located substantially below the level of the elements to be impregnated, and through which the preimpregnating substance is introduced or removed.

Enclosure 1 also has an upper orifice 11 allowing the vacuum to be produced or enclosure 1 to be pressurized. This upper orifice 11 communicates with a space 12 inside the enclosure which is not wetted by impregnating substance 13.

One purpose of this inner space 12 is to prevent the impregnating substance from rising through upper orifice 11 into the vacuum pumping means.

The following non-limitative example which relates to preimpregnation of a 2 kg spool of glass fibers, illustrates one way in which the process according to the invention can be implemented.

When spool 2 of reinforcing elements is disposed in enclosure 1, orifice 11 is connected to the vacuum pumping means.

With these pumping means, the pressure in the enclosure is reduced for a sufficient length of time, for example by producing an absolute pressure of a few millimeters of mercury, for a quarter of an hour. In this way, substances that generate inclusions harmful to fabrication of composite parts, such as gas or steam bubbles absorbed or adsorbed in the reinforcing elements, can be eliminated.

While maintaining the vacuum in the enclosure, a sufficient quantity of pre-degassed and -dried impregnating substance is introduced slowly via lower orifice 10 in such a way that it still covers the reinforcing elements once they have been impregnated.

Degassing and drying of the impregnating substance may be accomplished with the aid of a reservoir in which the vacuum is created until the bubbles totally disappear. for example, if the impregnating substance is a resin based on DGEBA (diglycidylether bisphenol A), the vacuum may be 2 to 3 Torr for 30 minutes for degassing and drying 4 kg at 40° C.

After substance 13 has been introduced into enclosure 1, the enclosure can either be kept under a vacuum or raised to a pressure close to atmospheric pressure, or raised to higher pressures. The effectiveness of preimpregnation increases with pressure; however, diffusion of gas into the substance, which is not very significant at atmospheric pressure, should be avoided at higher pressures. However, maintenance of the vacuum allows excellent preimpregnation quality to be obtained for acceptable times. Thus, with a 2 kg spool of fiberglass rovings (spool with 3 cm glass thickness), 2 hours are sufficient for preimpregnation.

When preimpregnation is accomplished under pressure, instead of the level of substance in the enclosure being at least equal to the level of the substance at the end of preimpregnation, the enclosure is filled completely; then, while ensuring that no gas such as air or steam contacts the substance, a hydraulic pressure is produced such as to cause the substance to penetrate into the spool.

This hydraulic pressure may be obtained for example by means of a pump, supplied with the substance and supplying the enclosure, or by means of deformation of the volume of substance in the enclosure by example, using a fluid under pressure deforming a separating membrane that isolates the fluid from the substance, or using a variable-geometry enclosure such as an enclosure with a piston.

In order to improve penetration of the impregnating substance into the reinforcing elements, its viscosity may be decreased by increasing its temperature. This may be done by heating the substance, for example from 30° to 50° C., so that the viscosity is approximately for example 5 Pa.s (5 Po) either prior to its introduction into the enclosure or in the enclosure itself. This heating of the resin should not be too great, to prevent certain components from boiling and the resin from evolving.

Without departing from the framework of the invention, and to obtain the same effect, one may heat the reinforcing elements prior to introduction of the substance such that, on contact with the elements, the substance heats. This heating of the reinforcing elements, which reduces the viscosity of the impregnating substance, is also particularly favorable to desorption of the gases and water responsible for harmful inclusions.

If it is desired to desorb water, in particular, from the reinforcing elements without overheating the fiber spool, microwave heating may be done, preferably during the vacuum stage.

Figure 2:
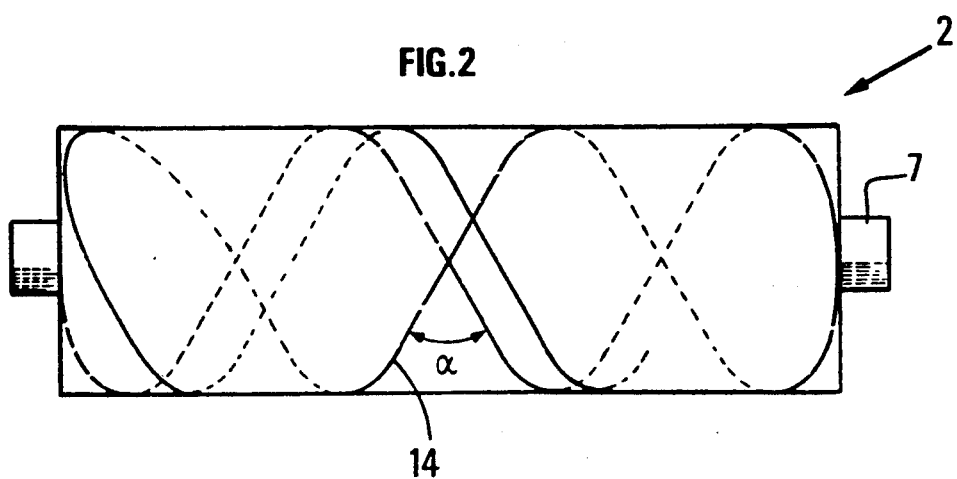
FIG. 2 is a detail of the winding of the reinforcing elements.

FIG. 2 shows schematically a spool 2 of fibers 14 wound on a mandrel 7. According to the invention, the setting of angle alpha ($\alpha$) between the turns of consecutive layers on a spool allows the rate of impregnation to be regulated (ratio between volume of impregnating substance and volume of fibers to be impregnated); also, the closer the angle alpha is to 90°, the less the risks of reduction of the impregnated threads by fraying during unwinding of the spool. A satisfactory angle alpha may be obtained by rewinding of the spools with a suitable fiber pitch. This rewinding also offers the advantage of aerating and regulating the tension of the fibers.

Just as the method and device according to the invention apply to preimpregnation of a spool of reinforcing threads, fabrics or braids, whether or not they are wound onto a mandrel, may be preimpregnated.

We claim:

1. A process for preimpregnating reinforcing elements including fibers, fabrics or braids with a liquid substance, said reinforcing elements being usable to make a composite material, characterized by having the following series of stages:
   said reinforcing elements are placed in an enclosure,
   a vacuum of sufficient intensity and duration is produced in said enclosure to eliminate at least the majority of water and gas present in the reinforcing elements, and
   a sufficient quantity of said substance is introduced into said enclosure so that said substance will cover said elements once the elements have been impregnated; said liquid substance being a solvent-free thermosetting resin in state A.

2. A process according to claim 1 characterized by degassing said substance under vacuum before introducing the substance into said enclosure.

3. A process according to claim 1 characterized by using said substance when hot.

4. A process according to claim 1 characterized by maintaining said enclosure in a vacuum after introducing the sufficient quantity of said substance.

5. A process according to claim 4 characterized by, after producing the vacuum in the enclosure and introducing said substance into said enclosure in a sufficient quantity for said substance to cover said elements once they have been impregnated, said enclosure is pressurized.

6. A process according to claim 5 characterized by when the enclosure has been pressurized, introduction of material into the substance impregnating said reinforcing elements is prevented.

7. A process according to claim 1 characterized by said reinforcing elements being fibers wound onto a mandrel and by the turns of consecutive layers crossing at an angle of at least 30°.

8. A process according to claim 7 wherein said reinforcing elements are fibers wound onto a mandrel, characterized by the mandrel being perforated.

* * * * *